(12) United States Patent
Zhang et al.

(10) Patent No.: US 11,583,822 B2
(45) Date of Patent: Feb. 21, 2023

(54) INTERMEDIATE GAS CONCENTRATION-REGULATING PISTON PRESSURE DEVICE FOR HIGH-TEMPERATURE AUTOCLAVE AND GAS DISTRIBUTION METHOD

(71) Applicants: Southwest Petroleum University, Sichuan (CN); Engineering Technology Research Institute, Southwest Oil and Gas Field Company of Petro China, Sichuan (CN)

(72) Inventors: Zhi Zhang, Sichuan (CN); Jinming Liu, Sichuan (CN); Huali Zhang, Sichuan (CN); Yufei Li, Sichuan (CN); Jiawei Wang, Sichuan (CN); Duo Hou, Sichuan (CN); Jian Ding, Sichuan (CN); Yuanjin Zhao, Sichuan (CN); Lin Zhang, Sichuan (CN); Wei Luo, Sichuan (CN); Chuanlei Wang, Sichuan (CN); Pengfei Sang, Sichuan (CN)

(73) Assignees: Southwest Petroleum University, Sichuan (CN); Engineering Technology Research Institute, Southwest Oil and Gas Field Company of Petro China, Sichuan (CN)

( * ) Notice: Subject to any disclaimer, the term of this patent is extended or adjusted under 35 U.S.C. 154(b) by 76 days.

(21) Appl. No.: 17/315,216

(22) Filed: May 7, 2021

(65) Prior Publication Data
US 2021/0260547 A1 Aug. 26, 2021

(30) Foreign Application Priority Data
Jul. 7, 2020 (CN) .......................... 202010643480.9

(51) Int. Cl.
*B01J 3/02* (2006.01)
*B01J 3/04* (2006.01)
(Continued)

(52) U.S. Cl.
CPC ............. *B01J 19/002* (2013.01); *B01J 3/002* (2013.01); *B01J 3/02* (2013.01); *B01J 3/04* (2013.01);
(Continued)

(58) Field of Classification Search
None
See application file for complete search history.

(56) References Cited

FOREIGN PATENT DOCUMENTS

| CN | 105928867 A | * | 9/2016 | ............ G01N 17/02 |
| CN | 106568703 A | * | 4/2017 | ........... G01N 17/006 |
| CN | 110630228 A | * | 12/2019 | |

* cited by examiner

*Primary Examiner* — Jennifer A Leung

(57) ABSTRACT

A piston pressure device includes a gas concentration-regulating piston pressure device and a high temperature autoclave. In the gas concentration-regulating piston pressure device, the proportion and concentration of corrosive gases can be accurately adjusted, intermediate gases can be stored and filled into the high temperature autoclave according to experimental needs, and an actual corrosion process in oilfield is accurately simulated. Meanwhile, the corrosive gases can be supplemented in real time during the experiment, and dynamic gas distribution in a high-temperature high-pressure corrosion experiment process is realized. The present invention has the advantages as follows: the piston pressure device is resistant to high temperature and high pressure, corrosion-resistant, simple in structure and convenient to operate; the concentration and proportion of the corrosive gases are accurately controlled to be invariable in the high-temperature high-corrosion experiment process;

(Continued)

and reliability of high-temperature high-pressure corrosive experimental results is increased.

2 Claims, 1 Drawing Sheet

(51) Int. Cl.
*B01J 4/02* (2006.01)
*G01N 17/00* (2006.01)
*B01J 19/00* (2006.01)
*B01J 3/00* (2006.01)
*F04C 25/02* (2006.01)

(52) U.S. Cl.
CPC ................ *B01J 4/02* (2013.01); *F04C 25/02* (2013.01); *G01N 17/002* (2013.01); *B01J 2204/002* (2013.01); *B01J 2219/00186* (2013.01)

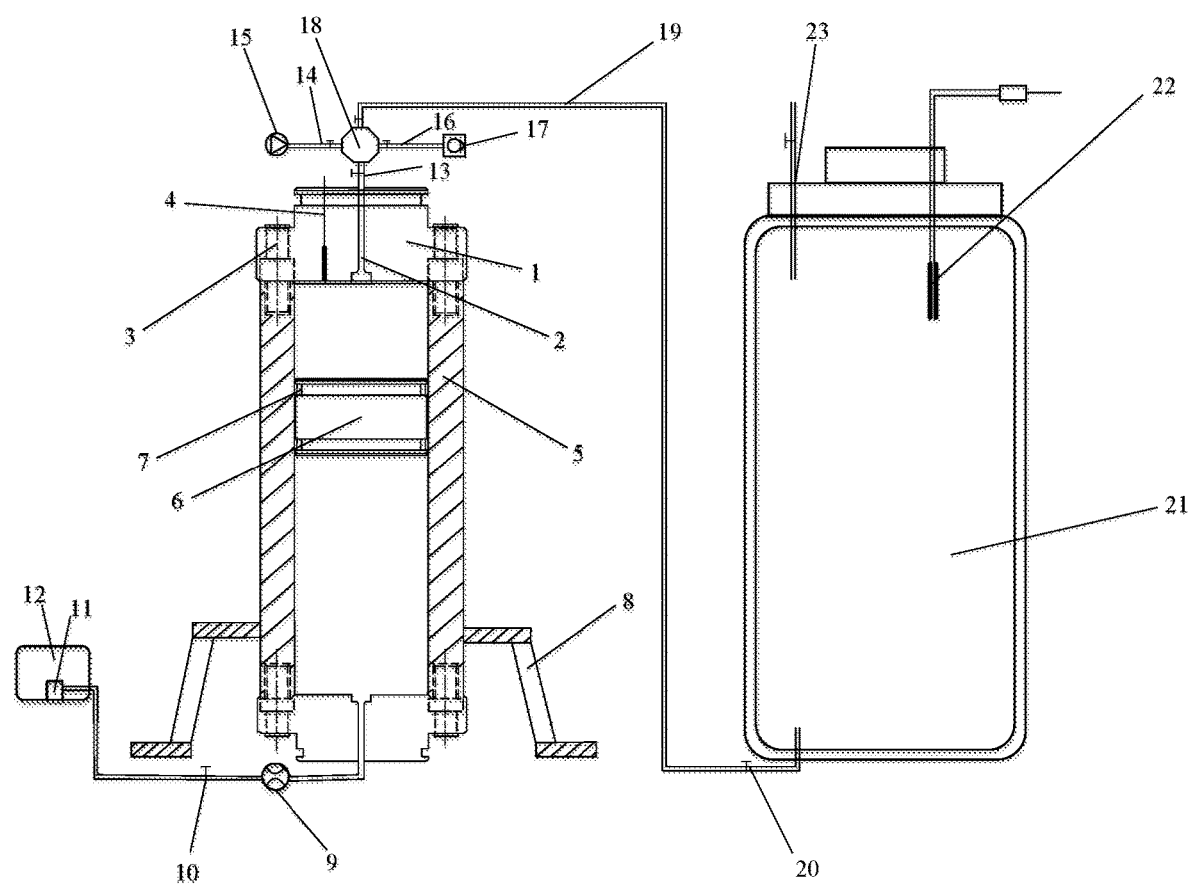

INTERMEDIATE GAS CONCENTRATION-REGULATING PISTON PRESSURE DEVICE FOR HIGH-TEMPERATURE AUTOCLAVE AND GAS DISTRIBUTION METHOD

CROSS REFERENCE OF RELATED APPLICATION

The present invention claims priority under 35 U.S.C. 119(a-d) to CN 202010643480.9, filed Jul. 7, 2020.

BACKGROUND OF THE PRESENT INVENTION

Field of Invention

The present invention belongs to the technical field of high temperature autoclave experiments, and particularly relates to an intermediate gas concentration-regulating piston pressure device for a high temperature autoclave and a gas distribution method.

Description of Related Arts

Conventionally, when a corrosion experiment is conducted by a high temperature autoclave in a lab, $H_2S$, $CO_2$, $O_2$, $CH_4$ and $N_2$ gas bottles are directly connected to a booster pump so as to fill the gases into the high temperature autoclave body. Concentrations of the filled gases are determined by virtue of partial pressures of the filled gases. However, when the temperature and pressure are changed, the partial pressures of the filled gases are dynamically changed, and a gas concentration ratio cannot be accurately simulated in an actual high-temperature high-pressure working condition. Moreover, in the experimental process, the gases cannot be supplemented in real time when the gas concentration is decreased; the actual working conditions in oilfield cannot be accurately simulated; and a certain deviation exists between the tested corrosion rate and the actual working conditions. Therefore, accurately preparing the corrosive gas concentration is the key of increasing consistency of the simulated high-temperature high-pressure corrosion experiment and the actual working conditions. However, there has been no device that can realize accurate preparation of the corrosive gas concentration of the high temperature autoclave at present.

SUMMARY OF THE PRESENT INVENTION

With respect to the defects in the prior art, the present invention provides an intermediate gas concentration-regulating piston pressure device for a high temperature autoclave and a gas distribution method, thereby solving the defects in the prior art.

To achieve the above inventive purpose, technical solutions of the present invention are as follows:

The intermediate gas concentration-regulating piston pressure device for the high temperature autoclave includes a gas concentration-regulating piston pressure device and a high temperature autoclave.

The gas concentration-regulating piston pressure device includes a plug, a cylinder, a piston, a base, an oil tank, an oil pipe, a gas inlet pipeline, a gas outlet pipeline, a vacuum pump, a four-way valve and a high temperature autoclave ventilation connection pipeline.

The piston is arranged in the cylinder; an opening in an upper end of the cylinder is sealed by the plug; and the plug is fixed on the cylinder via a screw.

A concentration probe and a ventilation connection pipeline are mounted on the plug, both penetrate through the plug and are communicated with an interior of the cylinder; the concentration probe is used for detecting a gas concentration inside the cylinder; and when an injected gas is a single gas, a concentration of the injected gas is acquired by the concentration probe. The ventilation connection pipeline is further provided with a gas inlet valve.

An oil transport hole is formed in a lower end of the cylinder; an oil pump is arranged in the oil tank; two ends of the oil pipe are respectively connected to the oil pump and the oil transport hole; the oil pipe is further provided with a control valve and a flowmeter; the oil pump is used for pumping oil in the oil tank into the cylinder; and the piston is pushed onto a top of the cylinder.

The other end of the ventilation connection pipeline is connected to the four-way valve; and the gas inlet pipeline, the ventilation connection pipeline, the gas outlet pipeline and the high temperature autoclave ventilation connection pipeline are connected onto the four-way valve.

The four-way valve can open or close any one or more valve ports itself.

The gas inlet pipeline is connected to a booster pump for boosting the concentration-regulating piston pressure device.

The gas outlet pipeline is connected to a vacuum pump for vacuumizing the concentration-regulating piston pressure device.

The high temperature autoclave ventilation connection pipeline is connected to the high temperature autoclave; and a valve is mounted on the high temperature autoclave ventilation connection pipeline.

A base is mounted at a bottom of the cylinder for fixing the whole concentration-regulating piston pressure device.

A concentration probe is arranged in the high temperature autoclave to monitor a concentration of gases inside the autoclave in real time.

The high temperature autoclave is further provided with an exhaust valve.

The present invention further discloses a gas distribution method of the intermediate gas concentration-regulating piston pressure device for the high temperature autoclave, including steps of:

pumping hydraulic oil into a cylinder by utilizing an oil pump and an oil tank before gas filling; pushing a piston to the top of the cylinder; vacuumizing the interior of the cylinder by utilizing a vacuum pump; removing a pressure of the hydraulic oil; opening a gas inlet valve; determining a relative proportion of gases in advance if two or more gases exist; monitoring flow of the hydraulic oil according to a flowmeter; determining introduction amounts of different gases by utilizing a volumetric method; and finally, pushing proportioned gases into a high temperature autoclave, and performing auxiliary boosting by a booster pump if a pressure of the high temperature autoclave is high.

Further, change of a gas concentration in a corrosion reaction process of the high temperature autoclave is monitored by a concentration probe in real time; a new gas ratio is prepared by the gas concentration-regulating piston pressure device; the hydraulic oil is pumped into the cylinder by utilizing the oil pump and the oil tank before gas filling; the piston is pushed to the top of the cylinder; the interior of the cylinder is vacuumized by utilizing the vacuum pump; the pressure of the hydraulic oil is removed; and the gas inlet valve is opened.

If the injected gas is a single gas, the concentration of the injected gas is acquired by the concentration probe.

If two and more gases exist, the relative proportion of the gases is determined in advance; flow of the hydraulic oil is monitored according to the flowmeter; and introduction amounts of different gases are determined by utilizing the volumetric method. The gases in the high temperature autoclave are discharged by an exhaust valve; then a valve is opened to inject gases of a new ratio; gas concentrations in the high temperature autoclave are regulated at any time; and the gases are supplemented, thereby simulating various gas-drive gas production conditions and simulating a dynamic change process of the gases when field working conditions are changed.

Compared with the prior art, the present invention has advantages as follows:

With respect to the defects that the conventional high temperature autoclave device cannot accurately simulate gas concentrations, the present invention provides a piston pressure device, which can accurately simulate the actual corrosion process in oilfield, is resistant to high pressure, corrosion-resistant and simple in structure, and can accurately prepare proportions and concentrations of corrosive gases, store intermediate gases and fill the gases into the high temperature autoclave according to experimental needs, and accurately control the concentration and proportion of the corrosive gases to be invariable in the high-temperature high-corrosion experiment process. Meanwhile, the corrosive gases can be supplemented in real time during the experiment; dynamic gas distribution in the high-temperature high-pressure corrosion experiment process is realized; and reliability of high-temperature high-pressure corrosive experimental results is increased.

BRIEF DESCRIPTION OF THE DRAWINGS

FIGURE is a structural schematic diagram of an intermediate gas concentration-regulating piston pressure device for a high temperature autoclave in embodiments of the present invention.

DETAILED DESCRIPTION OF THE PREFERRED EMBODIMENT

To make the purposes, technical solutions and advantages of the present invention clearer, the present invention will be further described in detail below in accordance with drawings and illustrated embodiments.

As shown in FIGURE, an intermediate gas concentration-regulating piston pressure device for a high temperature autoclave includes a gas concentration-regulating piston pressure device and a high temperature autoclave 21.

The gas concentration-regulating piston pressure device includes a plug 1, a cylinder 5, a piston 6, an oil tank 12, a base 8 and an oil pipe.

The piston 6 is arranged in the cylinder 5; an opening in an upper end of the cylinder 5 is sealed by the plug 1; and the plug 1 is fixed on the cylinder 5 via a screw 3.

A concentration probe 4 and a ventilation connection pipeline 2 are mounted on the plug 1, both penetrate through the plug 1 and are communicated with an interior of the cylinder 5; the concentration probe 4 is used for detecting a gas concentration inside the cylinder 5; and when an injected gas is a single gas, a concentration of the injected gas is acquired by the concentration probe 4. The ventilation connection pipeline 2 is further provided with a gas inlet valve 13.

An oil transport hole is formed in a lower end of the cylinder 5; an oil pump 11 is arranged in the oil tank 12; two ends of the oil pipe are respectively connected to the oil pump 11 and the oil transport hole; the oil pipe is further provided with a control valve 10 and a flowmeter 9; the oil pump 11 is used for pumping oil in the oil tank 12 into the cylinder 5; and the piston 6 is pushed onto a top of the cylinder 5.

The other end of the ventilation connection pipeline 2 is connected to a four-way valve 18; and a gas inlet pipeline 14, a ventilation connection pipeline 2, a gas outlet pipeline 16 and a high temperature autoclave ventilation connection pipeline 19 are connected onto the four-way valve 18.

The four-way valve 18 can open or close any one or more valve ports itself.

The gas inlet pipeline 14 is connected to booster pump 15 for boosting the concentration-regulating piston pressure device.

The gas outlet pipeline 16 is connected to a vacuum pump 17 for vacuuming the concentration-regulating piston pressure device.

The high temperature autoclave ventilation connection pipeline 19 is connected to the high temperature autoclave 21; and a valve 20 is mounted on the high temperature autoclave ventilation connection pipeline 19.

The base 8 is mounted at the bottom of the cylinder 5 for fixing the whole concentration-regulating piston pressure device.

A concentration probe 22 is arranged in the high temperature autoclave 21 to monitor a concentration of gases inside the autoclave in real time.

The high temperature autoclave 21 is further provided with an exhaust valve 23.

A gas distribution method of the intermediate gas concentration-regulating piston pressure device for the high temperature autoclave is as follows:

Before the gases enter the high temperature autoclave 21, partial pressures and concentrations of the gases are regulated by a built-in piston method; and the gases are filled into the high temperature autoclave 21, thereby ensuring that the concentration and proportion of the gases are always invariable regardless of change of the total pressure, supplementing corrosive gases in real time during the experiment and realizing dynamic gas distribution in the corrosion experiment process.

The method includes the following specific steps: pumping hydraulic oil into a cylinder 5 by utilizing an oil pump 11 and an oil tank 12 before gas filling; pushing a piston 6 to the top of the cylinder 5; vacuumizing the interior of the cylinder 5 by utilizing a vacuum pump 17; removing a pressure of the hydraulic oil; opening a gas inlet valve 13; determining a relative proportion of the gases in advance if two or more gases exist; monitoring flow of the hydraulic oil according to a flowmeter 9; determining introduction amounts of different gases by utilizing a volumetric method; and finally, pushing proportioned gases into a high temperature autoclave 21, and performing auxiliary boosting by a booster pump 15 if a pressure of the high temperature autoclave 21 is high.

The gas concentration-regulating piston pressure device may realize other functions as follows: change of a gas concentration in a corrosion reaction process of the high temperature autoclave 21 is monitored by a concentration probe 22 in real time; a new gas ratio is prepared by the gas concentration-regulating piston pressure device; the hydraulic oil is pumped into the cylinder 5 by utilizing the oil pump 11 and the oil tank 12 before gas filling; the piston 6 is pushed to the top of the cylinder 5; the interior of the cylinder 5 is vacuumized by utilizing the vacuum pump 17; the pressure of the hydraulic oil is removed; and the gas inlet valve 13 is opened.

If the injected gas is a single gas, the concentration of the injected gas is acquired by the concentration probe 22; if two and more gases exist, the relative proportion of the gases is determined in advance; flow of the hydraulic oil is monitored according to the flowmeter 9; and introduction amounts of different gases are determined by utilizing the volumetric method. The gases in the high temperature autoclave are discharged by an exhaust valve 23; then a valve 20 is opened to inject gases of a new ratio; gas concentrations in the high temperature autoclave 21 are regulated at any time; and the gases are supplemented, thereby accurately simulating various gas-drive gas production conditions and simulating a dynamic change process of the gases when field working conditions are changed.

Those ordinary skilled in the art may recognize that, the embodiments described herein are used to help readers to understand the implementation method of the present invention, and shall be understood as the protection scope of the present invention, but not limited to these specific statements and embodiments. Other specific variations and combinations may be made by those ordinary skilled in the art without departing from the essence of the present invention in accordance with the technical implications disclosed by the present invention. These variations and combinations shall still be included in the protection scope of the present invention.

What is claimed is:

1. An intermediate gas concentration-regulating piston pressure device, comprising: a gas concentration-regulating piston pressure device and an autoclave (21), wherein
    the gas concentration-regulating piston pressure device comprises a plug (1), a cylinder (5), a piston (6), an oil tank (12), an oil pipe, a gas inlet pipeline (14), a gas outlet pipeline (16), a vacuum pump (17), a four-way valve (18) and an autoclave ventilation connection pipeline (19);
    the piston (6) is arranged in the cylinder (5); an opening in an upper end of the cylinder (5) is sealed by the plug (1); and the plug (1) is fixed on the cylinder (5) via a screw (3);
    a concentration probe (4) and a ventilation connection pipeline (2) are mounted on the plug (1), both penetrate through the plug (1) and are communicated with an interior of the cylinder (5); the concentration probe (4) is used for detecting a gas concentration inside the cylinder (5); and when an injected gas is a single gas, a concentration of the injected gas is acquired by the concentration probe (4); and the ventilation connection pipeline (2) is further provided with a gas inlet valve (13);
    an oil transport hole is formed in a lower end of the cylinder (5); an oil pump (11) is arranged in the oil tank (12); two ends of the oil pipe are respectively connected to the oil pump (11) and the oil transport hole; the oil pipe is further provided with a control valve (10) and a flowmeter (9); the oil pump (11) is used for pumping oil in the oil tank (12) into the cylinder (5); and the piston (6) is pushed onto a top of the cylinder (5);
    the other end of the ventilation connection pipeline (2) is connected to the four-way valve (18); and the gas inlet pipeline (14), the ventilation connection pipeline (2), the gas outlet pipeline (16) and the autoclave ventilation connection pipeline (19) are connected onto the four-way valve (18);
    the gas inlet pipeline (14) is connected to a booster pump (15) which functions to boost a pressure of the gas being supplied through the ventilation connection pipeline (19) to the autoclave (21);
    the gas outlet pipeline (16) is connected to a vacuum pump (17) which functions to evacuate gas from the cylinder (5);
    the autoclave ventilation connection pipeline (19) is connected to the autoclave (21); and a valve (20) is mounted on the autoclave ventilation connection pipeline (19);
    a base (8) is mounted at the bottom of the cylinder (5) for fixing the whole concentration-regulating piston pressure device;
    a concentration probe (22) is arranged in the autoclave (21) to monitor a gas concentration inside the autoclave in real time; and
    the autoclave (21) is further provided with an exhaust valve (23).

2. A gas distribution method of the intermediate gas concentration-regulating piston pressure device of claim 1, comprising steps of:
    pumping the oil into the cylinder (5) by utilizing the oil pump (11) and the oil tank (12) before gas filling; pushing the piston (6) to the top of the cylinder (5); vacuuming the interior of the cylinder (5) by utilizing the vacuum pump (17); removing a pressure of the oil; opening the gas inlet valve (13); monitoring flow of the oil according to the flowmeter (9); and finally, pushing the gas being supplied through the ventilation connection pipeline (19) into the autoclave (21) and boosting a pressure of the gas by the booster pump (15).

* * * * *